United States Patent
Ruddy

(10) Patent No.: US 6,929,193 B2
(45) Date of Patent: Aug. 16, 2005

(54) TIP FOR A FOAM-IN-PLACE DISPENSER

(75) Inventor: Henry J Ruddy, Sandy Hook, CT (US)

(73) Assignee: Sealed Air Corporation, Saddle Brook, NJ (US)

( * ) Notice: Subject to any disclaimer, the term of this patent is extended or adjusted under 35 U.S.C. 154(b) by 226 days.

(21) Appl. No.: 10/097,913

(22) Filed: Mar. 13, 2002

(65) Prior Publication Data

US 2003/0173416 A1 Sep. 18, 2003

(51) Int. Cl.⁷ .............................................. B05B 15/02
(52) U.S. Cl. .................... 239/112; 239/117; 222/145.2; 222/149
(58) Field of Search ................................. 239/106, 112, 239/113, 115, 116, 117; 222/145.1, 145.2, 145.5, 148, 149

(56) References Cited

U.S. PATENT DOCUMENTS

| | | |
|---|---|---|
| 3,687,370 A | 8/1972 | Sperry |
| 3,741,482 A | 6/1973 | Eliason et al. |
| 3,938,298 A | 2/1976 | Luhman et al. |
| 3,945,569 A | 3/1976 | Sperry |
| 4,023,733 A * | 5/1977 | Sperry .................... 239/112 |
| 4,169,002 A | 9/1979 | Larson |
| 4,377,256 A * | 3/1983 | Commette et al. .......... 239/117 |
| 4,426,023 A | 1/1984 | Sperry et al. |
| 4,674,268 A | 6/1987 | Gavronsky et al. |
| 4,800,708 A | 1/1989 | Sperry |
| 4,854,109 A | 8/1989 | Pinarer et al. |
| 4,893,453 A | 1/1990 | Weikert |
| 4,898,327 A | 2/1990 | Sperry et al. |
| 5,027,583 A | 7/1991 | Chelak |
| 5,187,917 A | 2/1993 | Mykleby |
| 5,255,847 A | 10/1993 | Sperry et al. |
| 5,335,483 A | 8/1994 | Gavronsky et al. |
| 5,376,219 A | 12/1994 | Sperry et al. |
| 5,727,370 A | 3/1998 | Sperry |
| 5,776,510 A | 7/1998 | Reichental et al. |
| 5,873,215 A | 2/1999 | Aquarius et al. |
| 5,942,076 A | 8/1999 | Salerno et al. |
| 5,950,875 A | 9/1999 | Lee et al. |
| 6,003,288 A | 12/1999 | Sperry et al. |

FOREIGN PATENT DOCUMENTS

| | | |
|---|---|---|
| NL | 1 010 831 | 6/2000 |
| WO | WO 00/53501 | 9/2000 |

* cited by examiner

*Primary Examiner*—Steven J. Ganey
(74) *Attorney, Agent, or Firm*—Thomas C. Lagaly

(57) ABSTRACT

A foam-in-place dispenser and a porous tip therefore having a frusto-conical face, wherein an outermost rim of the tip extends beyond the discharge end of the dispenser.

7 Claims, 2 Drawing Sheets

TIP FOR A FOAM-IN-PLACE DISPENSER

BACKGROUND OF THE INVENTION

The present invention pertains generally to dispensers used to produce on-demand foam-in-place packaging cushions and, more particularly, to an improved tip for such dispensers.

Foam-in-place packaging is a highly useful technique for on-demand protection of packaged objects. In its most basic form, foam-in-place packaging comprises injecting foamable compositions from a dispenser into a container that holds an object to be cushioned.

Typically, the object is wrapped in plastic to keep it from direct contact with the rising (expanding) foam. As the foam rises, it expands into the remaining space between the object and its container (e.g. a corrugated board box) thus forming a custom cushion for the object.

A common foamable composition is formed by mixing an isocyanate compound with a hydroxyl-containing material, such as a polyol (i.e., a compound that contains multiple hydroxyl groups), typically in the presence of water and a catalyst. The isocyanate and polyol precursors react to form polyurethane. At the same time, the water reacts with the isocyanate compound to produce carbon dioxide. The carbon dioxide causes the polyurethane to expand into a foamed cellular structure, i.e., a polyurethane foam, which serves to protect the packaged object.

In other types of foam-in-place packaging, an automated device produces flexible containers, e.g., in the form of bags, from flexible, plastic film and dispenses a foamable composition into the containers as the containers are being formed. As the composition expands into a foam within the container, the container is sealed shut and typically dropped into a box or carton holding the object to be cushioned. The rising foam again tends to expand into the available space, but does so inside the container. Because the containers are formed of flexible plastic, they form individual custom foam cushions around the packaged objects. Exemplary devices for automatically producing foam-in-place cushions in this manner are assigned to the assignee of the present invention, and are illustrated, for example, in U.S. Pat. Nos. 4,800,708, 4,854,109, 5,376,219, and 6,003,288, the entire contents of each of which are incorporated herein by reference.

One difficulty with the foamable compositions used to make polyurethane foam for foam-in-place packaging is that the foam precursors and resultant foam tend to have somewhat adhesive properties. As a result, the foamable composition tends to stick to objects and then harden thereon into foam. This tendency is particularly problematic at the discharge end of the dispenser, in which the foam precursors are mixed and from which they are ejected. As is known, the polyol and isocyanate foam precursors must be withheld from mixing with one another until just prior to injection into a bag or other container. In the most common type of dispenser, the two foam precursors enter the dispenser, mix with one another in an internal chamber in the discharge end of the dispenser to form a foamable composition, and then the resultant foamable composition exits the dispenser via a tip (i.e., a nozzle) mounted at the discharge end of the dispenser. As the dispenser operates over and over again, particularly in automated or successive fashion, foamable composition tends to remain and build up on the tip, harden into foam, and block the proper exiting of further foamable composition. When this occurs, the hardened foam either completely occludes the tip or causes the foamable composition to be diverted in random, uncontrolled directions, i.e., not the intended direction, and generally requires clean-up of any misdirected foam and a hasty shut-down of the dispenser.

A number of different techniques and devices have been developed to provide for the removal of the foam residue at the end of each dispense cycle, generally employing the use of a cleaning solvent that is capable of dissolving and thereby removing the foamable mixture from the tip and other parts of the dispenser. One such technique utilizes a porous discharge tip through which a mixture of cleaning solvent and air is pumped. The agitation of the solvent and air as they are mixed and passed through the porous tip produces a cleaning action that serves to rinse the foam and foamable composition from the tip. See, e.g., U.S. Pat. No. 4,898,327, the entire disclosure of which is hereby incorporated herein by reference.

An improvement on the foregoing technique employs a frusto-conical surface on the face of the tip to provide a greater linear area over which the cleaning action takes place. See, e.g., U.S. Pat. Nos. 5,255,847 and 5,950,875, the entire disclosures of which are hereby incorporated herein by reference.

A further improvement, which is also disclosed in the foregoing patents, is the use of a pressure transducer or other means to measure the pressure required to force the air and solvent through the porous tip. The air/solvent mixture generally removes most but not all of the foamable composition from the tip such that foam residue gradually accumulates on the tip. As the accumulation of the foam residue increases, so does the pressure required to force the air and solvent through the porous element. When the pressure reaches a predetermined limit, the operator is alerted to service the injection nozzle and, optionally, the dispensing system may be caused to shut down.

While the foregoing techniques have proven to be effective in providing dispensers with a longer service life, a need for further improvement remains. Specifically, the inventor has discovered that, during the dispenser cleaning cycle, the solvent migrates away from the porous tip and drips from a local low point on the discharge end of the dispenser (in use, the dispenser normally assumes a substantially vertical orientation, with the discharge end of the dispenser, at which the tip is located, pointed downwards). The solvent that drips from the dispenser is saturated with the mixed foam precursor chemicals and, as the saturated solvent drips off the discharge end of the dispenser, a small amount of mixed foam precursor chemicals are left behind as a residue, which cures into a solid. With each dispense and cleaning cycle the solid residue accumulates and grows, much like a stalactite in a limestone cave. Because the saturated solvent migrates away from the porous tip, the foam residue does not accumulate on the tip and, therefore, the pressure required to force air and solvent through it does not increase even as the size of the foam residue 'stalactite' does increase. Eventually, the foam residue grows to a size where it interferes with the proper operation of the foam dispensing system but without alerting the operator (due the absence of a pressure increase). Further, because the residue accumulates away from the porous tip, the cleaning action of the air/solvent mixture on the surface of the porous tip is ineffective in preventing or slowing the growth of the residue, thereby resulting in a shorter service life than would otherwise be desired.

Accordingly, a need exists to further extend the service life of foam-in-place dispensers and to improve the ability of foam-in-place systems to notify the operator before enough foam residue accumulates near the dispenser tip to inhibit the next dispense cycle or divert the foam stream in an undesired fashion.

SUMMARY OF THE INVENTION

The present invention provides an improved dispenser tip that overcomes the problem of solvent migration away from the tip when it is positioned at the discharge end of a foam-in-place dispenser. The improved tip comprises:

a body formed of a material that is porous to gases and liquids, but which is substantially impermeable to the foamable compositions that flow through the dispenser;

a bore in the body that provides a channel through which the foamable compositions may flow and also through which an end portion of a valving rod can pass to control the flow of the foamable compositions through the dispenser; and at least one face of the body forming a frusto-conical surface directed inwardly toward the body so that when a mixture of cleaning solvent and air is directed through the body, a frothing mixture of air and solvent will exit the frusto-conical surface to provide cleaning action to facilitate the removal of at least a portion of any foamable compositions or derivatives thereof that may be in adherence with the circular face or the end portion of the valving rod, the frusto-conical surface having a major diameter and a minor diameter, the tip further including an outermost rim coincident with or adjacent to the major diameter;

wherein, the tip is adapted for positioning at the discharge end of the dispenser such that the outermost rim of the tip extends beyond the discharge end.

Another aspect of the invention pertains to a foam-in-place dispenser, comprising a housing having a discharge end, a valving rod disposed within the housing and being movable therein to control the flow of the foamable compositions through the dispenser, and a tip mounted at the discharge end of the housing and comprising:

a body formed of a material that is porous to gases and liquids, but which is substantially impermeable to the foamable compositions that flow through the dispenser, a bore in the body that provides a channel through which the foamable compositions may flow and also through which an end portion of the valving rod can pass, and at least one face of the body forming a frusto-conical surface directed inwardly toward the body so that when a mixture of cleaning solvent and air is directed through the body, a frothing mixture of air and solvent will exit the frusto-conical surface to provide cleaning action to facilitate the removal of at least a portion of any foamable compositions or derivatives thereof that may be in adherence with the circular face or the end portion of the valving rod, the frusto-conical surface having a major diameter and a minor diameter, the tip further including an outermost rim coincident with or adjacent to the major diameter;

wherein, the outermost rim of the tip extends beyond the discharge end of the housing.

By employing a frusto-conical shape with the outer rim extending beyond the discharge end of the dispenser, the solvent and resultant accumulation of foam residue is confined to the porous surface of the tip. This increases the effectiveness of the air/solvent mixture in removing the foam precursors and foam residue from the surface of the tip, thereby greatly extending the service life of the tip. The confinement of the saturated solvent to the surface of the tip also enables the monitoring of the pressure required to force the air/solvent mixture through the tip to be a more effective indicator of when the tip needs to be serviced or changed, thereby avoiding an unexpected blockage and attendant time-consuming clean-up operation.

DETAILED DESCRIPTION OF THE INVENTION

Figure 1:
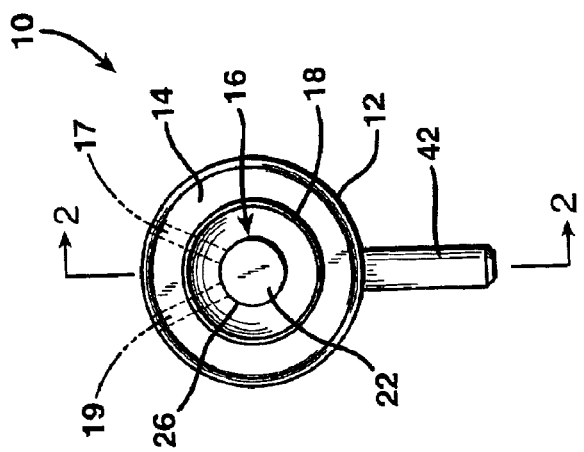
FIG. 1 is a front elevational view of a dispenser in accordance with the invention.
Figure 2:
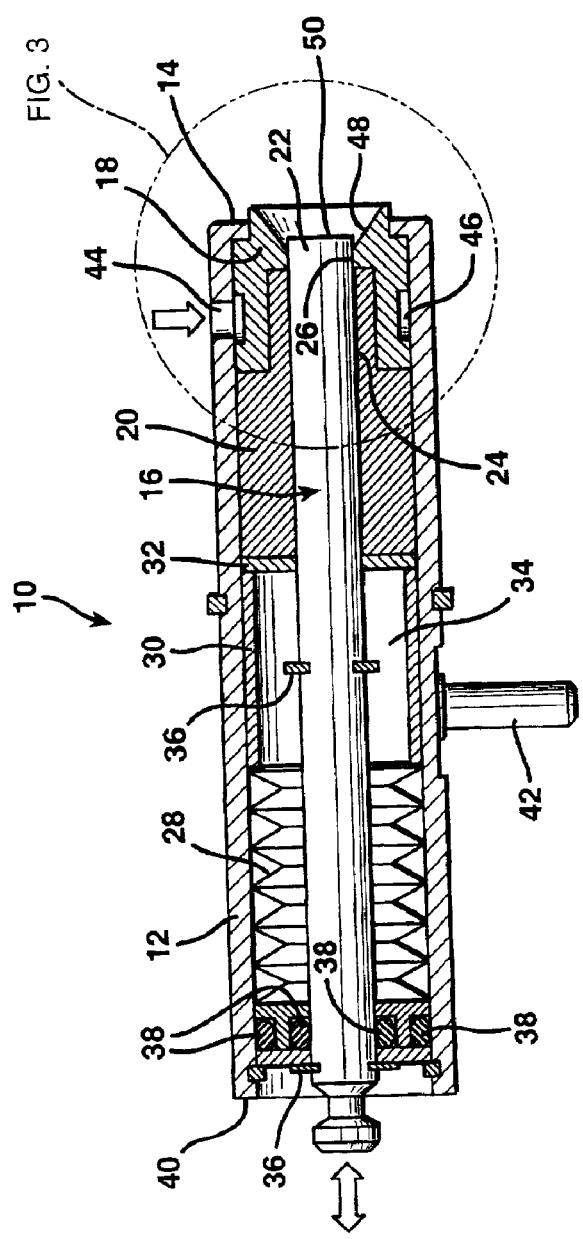
FIG. 2 is a cross-sectional view of the dispenser shown FIG. 1, taken along lines A—A.

FIGS. 1 and 2 illustrate a dispenser 10 in accordance with the present invention. Dispenser 10 includes a housing 12 having a discharge end 14, a valving rod 16 disposed with the housing, and a tip 18 mounted at the discharge end 14. The dispenser also includes a pair of openings 17 and 19 through housing 12 and through core portion 20 (see FIG. 1). Core portion bears against tip 18. Valving rod 16 is axially movable within the housing, as indicated by the double-headed arrow, to control the flow of foamable compositions through the dispenser. In particular, end portion 22 of the valving rod passes through bore 24 in core portion 20 and through corresponding bore 26 in tip 18 as the valving rod moves translatably and reciprocatably through the housing. As described in the above-referenced (and incorporated) U.S. Pat. No. 5,255,847, when valving rod 16 is retracted from the position shown, foam precursors (typically a polyol and an isocyanate, both of which are under pressure) are permitted to enter bore 24 separately via openings 17 and 19. That is, when valving rod 16, particularly end portion 22 thereof, retracts to an 'open' position (i.e., moves from right to left in the view shown in FIG. 2), bore 24 forms a channel in which the foam precursors mix to form a foamable composition, and bore 26 allows the foamable composition to flow out of the dispenser.

Dispenser 10 may also include a spring 28 that urges spacer 30 against scraper 32 to maintain a liquid-tight seal within bore 24 and 26, and also to scrape foam residue from valving rod 16 as it reciprocates through housing 12. A reservoir 34, as created by spacer 30, may be filled with a cleaning solvent to further remove foam residue that may be in adherence with the valving rod. Further components of the dispenser may include a pair of stop rings 36 on the valving rod 16 to define its range of movement, a pair of O-rings 38 to seal the dispenser at the end 40 opposite discharge end 14, and a mounting stud or threaded shaft 42 for mounting the dispenser on an appropriate fitting in a foam-in-place packaging machine (such as described hereinabove).

When valving rod 16 returns to its 'closed' position as shown in FIG. 2, it prevents the foam precursors from entering bore 24 by blocking openings 17 and 19 at their intersection with bore 24. In this manner, the valving rod also shuts off the flow of foamable composition out of bore 26 in tip 18. However, a small amount of foam residue remains on the tip, generally on the face 48 of the tip near bore 26 and on end portion 22 of the valving rod, particularly on end face 50 thereof As explained hereinabove, such residue, comprising the foamable composition and resultant foam, must be continuously removed to maintain the operability of the dispenser. An improved means for doing so will now be described.

Figure 3:
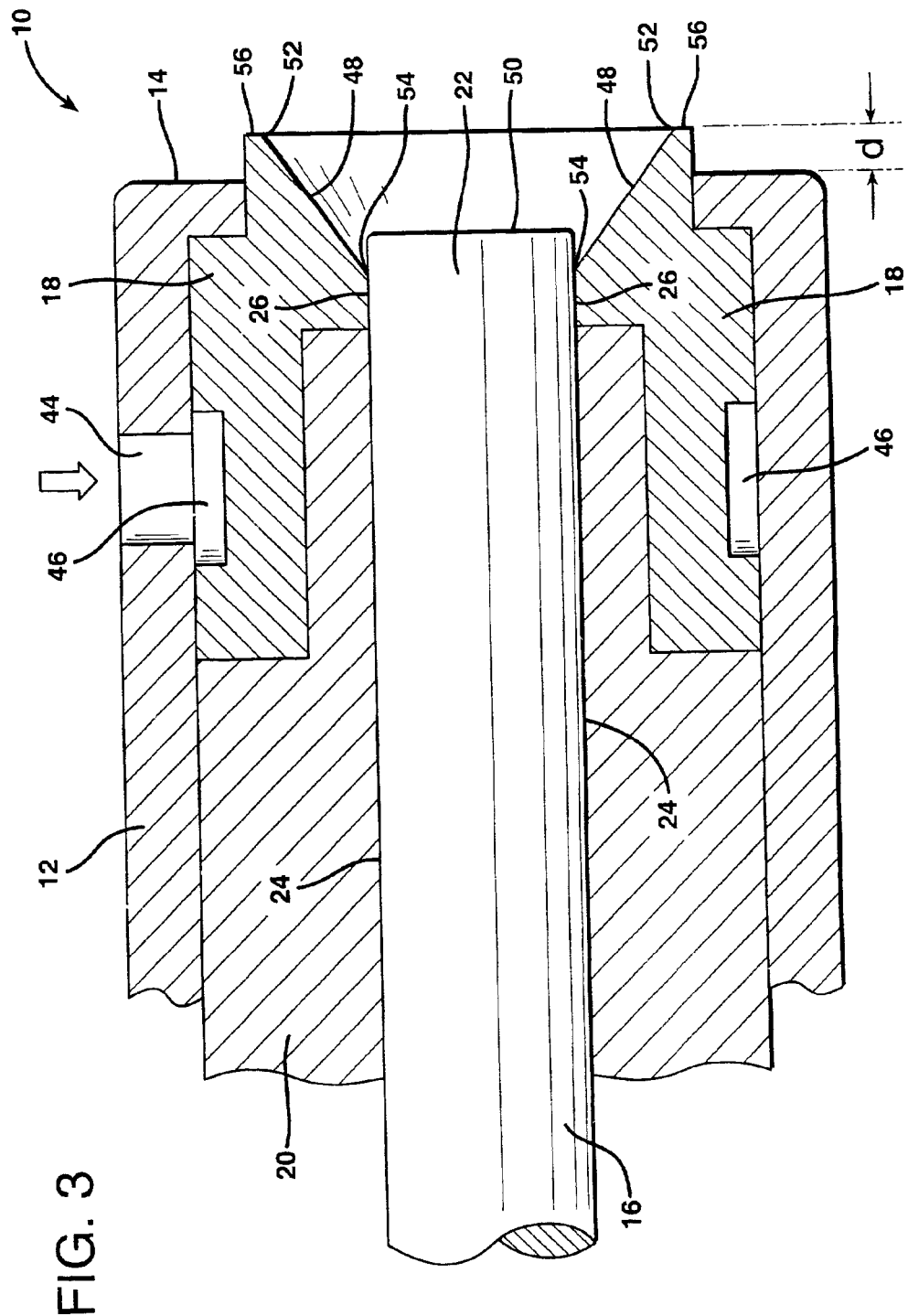
FIG. 3 is an enlarged cross-sectional view of the tip and discharge end of the dispenser shown in FIG. 2.

As perhaps shown most clearly in FIG. 3, tip 18 comprises a generally cylindrical body formed of a material that is porous to gases and liquids, but which is substantially impermeable to the foamable compositions that flow through the dispenser. Examples of suitable materials from which tip 18 may be constructed include sintered metal and porous plastic, such as porous polyethylene.

Housing 12 includes an inlet 44 into which a mixture of compressed air and solvent may be introduced to the porous tip 18, as indicated by the arrow. This may be facilitated by employing an annular chamber 46, which is concentric with housing 12 and extends around tip 18. The compressed air forces the air/solvent mixture from the annular chamber 46 and through the porous tip 18, where it exits the tip at the face 48 thereof. The agitation of the solvent and air as they are mixed and passed through the porous tip produces a frothing cleaning action that facilitates the rinsing and removal of foam residue from the face 48 of tip 18 and also from the end face 50 of valving rod 16. As explained more fully in the above-referenced U.S. Pat. No. 5,255,847, the effectiveness of the cleaning action produced by the air/solvent mixture is increased by providing face 48 of tip 18 as a frusto-conical surface directed inwardly toward the body of the tip as shown.

The frusto-conical surface of face 48 has a major diameter 52 and a minor diameter 54. Tip 18 further includes an outermost rim 56 that is coincident with or adjacent to the major diameter 52 of face 48. As shown, the outermost rim 56 is essentially coincident with major diameter 52. In other embodiments, rim 56 may be spaced from major diameter 52 but adjacent thereto, i.e., spatially closer to major diameter 52 than to minor diameter 54.

Significantly, the outermost rim 56 of tip 18 extends beyond the discharge end 14 of housing 12, i.e., beyond any surfaces of the discharge end of the housing that are adjacent to the tip, by a distance "d" as shown in FIG. 3. This feature, in combination with the porous construction of tip 18 and the frusto-conical shape of face 48, has been found to effectively confine to the face 48 of the tip the saturated solvent/foam residue mixture that rinses from the tip, rather allowing the saturated solvent to migrate to the adjacent surface(s) of discharge end 14 of the housing. As a result, the service life of the tip, and therefore of the dispenser, is greatly extended because the saturated solvent can be more completely rinsed from the face of the tip during the cleaning cycle. Further, when employing a pumping system, such as disclosed in the above-referenced U.S. Pat. Nos. 4,898,327 and 5,255,847, to supply a mixture of compressed air and solvent to the tip 18 via inlet 44 and annular chamber 46, the pressure of required to force the air/solvent mixture through the porous tip can be more effectively monitored to provide an indication of any build-up of foam residue on the face of the tip. When such pressure reaches a predetermined level, the foam-in-place packaging operator is alerted to service the dispenser, and in this manner an unexpected shutdown with attendant clean-up is avoided.

Distance "d" preferably ranges from about 0.01 to about 0.1 inch and, more preferably, from about 0.015 to about 0.06 inch. As an example, distance "d" may be 0.035 inch.

If desired, a removable tip may employed as disclosed in the above-referenced U.S. Pat. No. 5,950,875. Such a removable tip may be removably mounted to the discharge end of the dispenser, e.g., via threaded connection, so that it can be removed and cleaned or replaced as needed, without having to disassemble or replace the entire dispenser.

Dispenser 10 is preferably adapted to dispense a foamable composition comprising at least one member selected from polyols, isocyanates, and mixtures of polyols and isocyanates for foam-in-bag packaging. When used as such, the solvent employed is preferably capable of at least partially dissolving both the polyol and isocyanate foam precursors, as well as the foamable composition and polyurethane foam reaction-products produced by their mixture. Suitable cleaning solvents for this purpose may be selected from glycols, ethers, and mixtures of glycols and ethers, e.g., a mixture of tripropylene glycol and methyl ether.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention.

What is claimed is:

1. A foam-in-place dispenser through which foamable compositions are dispensed, said dispenser comprising:
   a housing having a discharge end;
   a valving rod disposed within said housing and being movable therein to control the flow of the foamable compositions through the dispenser; and
   a tip mounted at the discharge end of said housing and comprising:
      a body formed of a material that is porous to gases and liquids, but which is substantially impermeable to the foamable compositions that flow through the dispenser,
      a bore in said body that provides a channel through which the foamable compositions may flow and also through which an end portion of the valving rod can pass, and
      at least one face of said body forming a frusto-conical surface directed inwardly toward said body so that when a mixture of cleaning solvent and air is directed through said body, a frothing mixture of air and solvent will exit said frusto-conical surface to provide cleaning action to facilitate the removal of at least a portion of any foamable compositions or derivatives thereof that may be in adherence with said circular face or the end portion of the valving rod, said frusto-conical surface having a major diameter and a minor diameter, said tip further including an outermost rim coincident with or adjacent to said major diameter,
   wherein, the outermost rim of said tip extends beyond the discharge end of said housing to substantially confine the solvent, foamable composition and derivatives thereof to the porous, frusto-conical face of said tip.

2. The dispenser of claim 1, wherein said outermost rim extends beyond the discharge end of the housing by a distance ranging from about 0.01 to about 0.1 inch.

3. The dispenser of claim 2, wherein the outermost rim extends beyond the discharge end of the housing by a distance ranging from about 0.015 to about 0.06 inch.

4. The dispenser of claim 1, wherein said tip comprises at least one material selected from sintered metal and porous plastic.

5. The dispenser of claim 1, wherein said tip is removably mounted at the discharge end of the dispenser.

6. The dispenser of claim 1, wherein the dispenser is adapted to dispense a foamable composition comprising at least one member selected from polyols, isocyanates, and mixtures of polyols and isocyanates.

7. The dispenser of claim 1, wherein said tip is porous to cleaning solvents selected from glycols, ethers, and mixtures of glycols and ethers.

* * * * *